US008302462B2

(12) United States Patent
Kaneko et al.

(10) Patent No.: US 8,302,462 B2
(45) Date of Patent: Nov. 6, 2012

(54) KNOCK DETERMINATION DEVICE AND KNOCK DETERMINATION METHOD FOR INTERNAL COMBUSTION ENGINE

(75) Inventors: Rihito Kaneko, Nishikamo-gun (JP); Kenji Kasashima, Nishikamo-gun (JP); Masatomo Yoshihara, Toyota (JP); Kenji Senda, Okazaki (JP); Norihito Hanai, Toyota (JP); Yasuhiro Yamasako, Toyota (JP); Yuichi Takemura, Anjo (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 440 days.

(21) Appl. No.: 12/676,161

(22) PCT Filed: Jul. 28, 2008

(86) PCT No.: PCT/JP2008/063925
§ 371 (c)(1),
(2), (4) Date: Mar. 3, 2010

(87) PCT Pub. No.: WO2009/031378
PCT Pub. Date: Mar. 12, 2009

(65) Prior Publication Data
US 2011/0146384 A1 Jun. 23, 2011

(30) Foreign Application Priority Data

Sep. 3, 2007 (JP) ................................. 2007-227880

(51) Int. Cl.
*G01L 23/22* (2006.01)
(52) U.S. Cl. ..................................... 73/35.09; 73/114.07
(58) Field of Classification Search .................. 73/35.01, 73/35.03, 35.06, 35.09, 114.07
See application file for complete search history.

(56) References Cited

U.S. PATENT DOCUMENTS

| 5,115,779 A | | 5/1992 | Itoyama |
| 5,121,729 A | * | 6/1992 | Hashimoto et al. ...... 123/406.16 |
| 5,146,777 A | | 9/1992 | Polito et al. |
| 5,201,292 A | * | 4/1993 | Grajski et al. ........... 123/406.38 |
| 5,230,316 A | | 7/1993 | Ichihara et al. |
| 5,373,448 A | | 12/1994 | Katogi et al. |

(Continued)

FOREIGN PATENT DOCUMENTS

EP 0 421 952 4/1991

(Continued)

OTHER PUBLICATIONS

Office Action issued on Jan. 19, 2011 in the corresponding Russia Application No. 2010112852/28(018090) (with English Translation).

(Continued)

*Primary Examiner* — Freddie Kirkland, III
(74) *Attorney, Agent, or Firm* — Oblon, Spivak, McClelland, Maier & Neustadt, L.L.P.

(57) ABSTRACT

An engine ECU executes operations including: extracting vibration intensities of a plurality of frequency bands from vibration detected by a knock sensor, multiplying the extracted vibration intensity of each frequency band by a weight coefficient and adding the results in correspondence with crank angles to calculate integrated values of every five degrees; calculating a coefficient of correlation based on a result of comparison between a vibration waveform of a frequency band and a knock waveform model prepared in advance; calculating a knock intensity; determining occurrence of knocking in accordance with the calculated coefficient of correlation and the knock intensity; and determining no occurrence of knocking in accordance with the calculated coefficient of correlation and the knock intensity.

12 Claims, 12 Drawing Sheets

U.S. PATENT DOCUMENTS

| | | |
|---|---|---|
| 5,400,644 A | 3/1995 | Remboski, Jr. et al. |
| 5,408,863 A * | 4/1995 | Sawyers et al. .............. 73/35.05 |
| 5,608,633 A | 3/1997 | Okada et al. |
| 6,456,927 B1 | 9/2002 | Frankowski et al. |
| 6,867,691 B2 * | 3/2005 | Nishimura .................... 340/439 |
| 7,621,172 B2 * | 11/2009 | Yoshihara et al. ........... 73/35.06 |
| 7,669,459 B2 * | 3/2010 | Yoshihara et al. ........... 73/35.06 |
| 7,779,673 B2 * | 8/2010 | Kaneko et al. .............. 73/35.03 |
| 7,945,379 B2 * | 5/2011 | Kaneko et al. ................ 701/111 |
| 8,151,627 B2 * | 4/2012 | Masuda et al. ............... 73/35.06 |
| 2006/0185422 A1 | 8/2006 | Iwade et al. |
| 2007/0000307 A1 | 1/2007 | Yoshihara et al. |

FOREIGN PATENT DOCUMENTS

| | | |
|---|---|---|
| EP | 0 454 486 | 10/1991 |
| JP | 3-149336 | 6/1991 |
| JP | 4-8850 | 1/1992 |
| JP | 2006 226967 | 8/2006 |
| JP | 2007-211770 | 8/2007 |
| RU | 2 087 886 C1 | 8/1997 |
| SU | 1665252 A1 | 7/1991 |

OTHER PUBLICATIONS

Japanese Office Action issued Jul. 5, 2011, in Patent Application No. 2007-227880 (with English-language translation).

* cited by examiner

KNOCK DETERMINATION DEVICE AND KNOCK DETERMINATION METHOD FOR INTERNAL COMBUSTION ENGINE

TECHNICAL FIELD

The present invention relates to determination of knock in an internal combustion engine and, more specifically, to a technique for determining whether the engine knocks, based on vibration waveforms of the internal combustion engine.

BACKGROUND ART

Conventionally, various methods have been proposed for detecting knocking (knock) that occurs in an internal combustion engine. By way of example, there is a technique of determining generation of knock when vibration intensity in the internal combustion engine is larger than a threshold value. Even when the engine is not knocking, however, intensity of noise such as vibration experienced when an intake valve or an exhaust valve closes, may be higher than the the threshold value. In such a case, false determination that knock has occurred may be made, though actually knock has not occurred. Therefore, a technique has been proposed in which whether engine knocks or not is determined based on a result of comparison between a predetermined knock waveform model and a detected vibration waveform, so as to take into consideration characteristics other than intensity, such as attenuation ratio and crank angle at which vibration occurs.

Japanese Patent Laying-Open No. 2006-226967 discloses a knock determination device for an internal combustion engine, determining whether knock has occurred or not with high accuracy. The knock determination device for an internal combustion engine includes means for detecting vibration of the internal combustion engine, extracting means for extracting vibration in a frequency band of at least one of third and fourth tangential resonance modes in the cylinder of internal combustion engine from the detected vibration, and determination means for determining whether knock has occurred in the internal combustion engine, based on the extracted vibration.

In the knock determination device disclosed in the laid-open application mentioned above, vibration in the frequency band of at least one of third and fourth tangential resonance modes, which are typical resonance modes detected particularly at the time of knocking, is extracted from the vibration of internal combustion engine and, therefore, vibration involving less noise other than knocking can be extracted. Namely, vibration characteristic of knock generation can be extracted with high accuracy. Whether knock has occurred or not is determined based on the vibration. As a result, a knock determination device for an internal combustion engine that can determine whether knock has occurred or not with high accuracy can be provided.

Representative frequency band that involves vibration detected particularly at the time of knocking includes frequency bands of first, second, third and fourth tangential resonance modes. Among these frequency bands, some frequency bands are much susceptible to superposition of vibration particular to knocking, while other frequency bands are less susceptible. By way of example, vibration in the frequency band of first tangential mode is relatively susceptible to superposition of vibration particular to knocking. It is noted, however, that the frequency band of first tangential mode also tends to be much influenced by noise other than knocking.

When the vibration in frequency band of first tangential mode is removed as in the knock determination device disclosed in the laid-open application mentioned above, it follows that the frequency band much susceptible to superposition of vibration particular to knocking is removed and, therefore, false determination of knocking possibly occurs. Further, false determination of knocking may also occur if the influence of frequency band of first tangential mode is significant in determining whether knock has occurred or not.

DISCLOSURE OF THE INVENTION

An object of the present invention is to provide a knock determination device and a knock determination method for an internal combustion engine that can reduce false determination of knocking.

According to an aspect, the present invention provides a knock determination device for an internal combustion engine, including: a detecting unit detecting vibration of the internal combustion engine, and a determination unit connected to the detecting unit. The determination unit extracts, from the detected vibration, vibrations of a plurality of predetermined frequency bands corresponding to knocking, respectively, changes weights to intensities of the extracted vibrations of the plurality of frequency bands such that influence of noise other than knocking is reduced, detects a vibration waveform of a predetermined crank angle interval based on the intensity of vibrations of the plurality of frequency bands, and determines whether or not knock has occurred in the internal combustion engine using the detected vibration waveform.

According to the present invention, the determination unit changes the weights among vibration intensities of extracted plurality of frequency bands such that influence of noise other than knocking is reduced. By way of example, if the weight to vibration in a frequency band (for example, frequency band of first tangential mode) that is much influenced by superposition of noise other than knocking and susceptible to superposition of vibration corresponding to knocking is made smaller, influence of noise in determining knocking can be reduced. Accordingly, false determination of knocking caused by vibration in the frequency band influenced by noise is prevented, while knock determination can be made using vibration in the frequency band susceptible to superposition of vibration corresponding to knocking, whereby false determination can be reduced. Therefore, a knock determination device for an internal combustion engine that can reduce false determination of knocking can be provided.

Preferably, the determination unit changes the weight such that, among the intensities of extracted vibrations of the plurality of frequency bands, the ratio of vibration of at least one frequency band having influence on knock determination greater than a prescribed degree because of superposition of noise other than knocking is decreased.

According to the present invention, if the weight is changed such that the ratio of vibration intensity in a frequency band (for example, frequency band of first tangential mode) that much influences knock determination because of superposition of noise other than knocking and susceptible to superposition of vibration corresponding to knocking decreases, the influence of noise in determining knocking can be reduced. Thus, false determination of knocking can be reduced.

More preferably, the vibrations of the plurality of frequency bands include vibration of a frequency band of first tangential mode. The determination unit changes the weight such that weight on the intensity of vibration in the frequency band of first tangential mode is made smaller than weight on intensities of vibrations in other frequency bands.

According to the present invention, by changing the weight such that the ratio of vibration intensity in the frequency band of first tangential mode becomes smaller, the influence of noise in knock determination can be reduced. Thus, false determination of noise can be reduced.

More preferably, the determination unit changes weight such that, among the intensities of extracted vibrations of the plurality of frequency bands, the ratio of vibration of at least one frequency band having influence on knock determination smaller than a prescribed degree because of superposition of noise other than knocking is increased.

According to the present invention, by changing the weight such that the ratio of vibration intensity in a frequency band (for example, frequency band of third tangential mode) that does not much influence knock determination because of superposition of noise other than knocking and susceptible to superposition of vibration corresponding to knocking increases, the influence of noise in determining knocking can be reduced. Thus, false determination of knocking can be reduced.

More preferably, the vibrations of the plurality of frequency bands include vibration of a frequency band of third tangential mode. The determination unit changes the weight such that weight on the intensity of vibration in the frequency band of third tangential mode is made larger than weight on intensities of vibrations in other frequency bands.

According to the present invention, by changing the weight such that the ratio of vibration intensity in the frequency band of third tangential mode becomes larger, the influence of noise in knock determination can be reduced. Thus, false determination of noise can be reduced.

Preferably, based on a median of intensity of a frequency distribution of the vibration intensities of the plurality of frequency bands, the determination unit corrects the frequency distribution, and determines whether or not knock has occurred in the internal combustion engine using the corrected frequency distribution, in addition to the detected vibration waveform.

According to the present invention, the determination unit corrects frequency distribution based on the median of intensity in the vibration intensity frequency distribution of a plurality of frequency bands. Because of any change in weight or dependent on susceptibility to superposition of knock-specific vibration on each frequency band, the median of frequency distribution of each frequency band may possibly deviate from the median of frequency distribution of vibration intensity of other frequency bands. Therefore, based on the median of frequency distribution of vibration intensity of each frequency band (for example, using the mean value of medians), the frequency distribution is corrected, whereby the influence of deviation of median among frequency distributions on the detected vibration intensity is curbed, and false determination of knocking can be reduced.

More preferably, the determination unit corrects the frequency distribution using, as a reference, a mean value of medians of intensity of the frequency distribution of the vibration intensities of the plurality of frequency bands.

According to the present invention, the determination unit corrects frequency distribution based on the mean value of medians of intensity in the vibration intensity frequency distributions of a plurality of frequency bands. As a result, the influence of deviation of median among frequency distributions on the detected vibration intensity is curbed, and false determination of knocking can be reduced.

More preferably, the determination unit calculates knock intensity based on a sum of integrated values between predetermined crank angles of the vibration intensities of the plurality of frequency bands, and determines whether or not knock has occurred in the internal combustion engine based on a result of comparison between the calculated knock intensity and a predetermined determination value.

According to the present invention, based on a result of comparison between the predetermined determination value and the knock intensity calculated from the sum of integrated values in a predetermined crank angle range of vibration intensity in a plurality of frequency bands, whether knock has occurred in the internal combustion engine or not can be determined with high accuracy.

More preferably, the determination unit determines whether or not knock has occurred in the internal combustion engine based on a result of comparison between the detected vibration waveform and a predetermined waveform model as a reference of vibration waveform of the internal combustion engine, in addition to the result of comparison of the knock intensity.

According to the present invention, whether or not knock has occurred in the internal combustion engine can be determined with high accuracy based on the result of comparison between the detected vibration waveform and the predetermined waveform model as a reference vibration waveform of the internal combustion engine, in addition to the result of comparison of knock intensity.

BEST MODES FOR CARRYING OUT THE INVENTION

Figure 1:
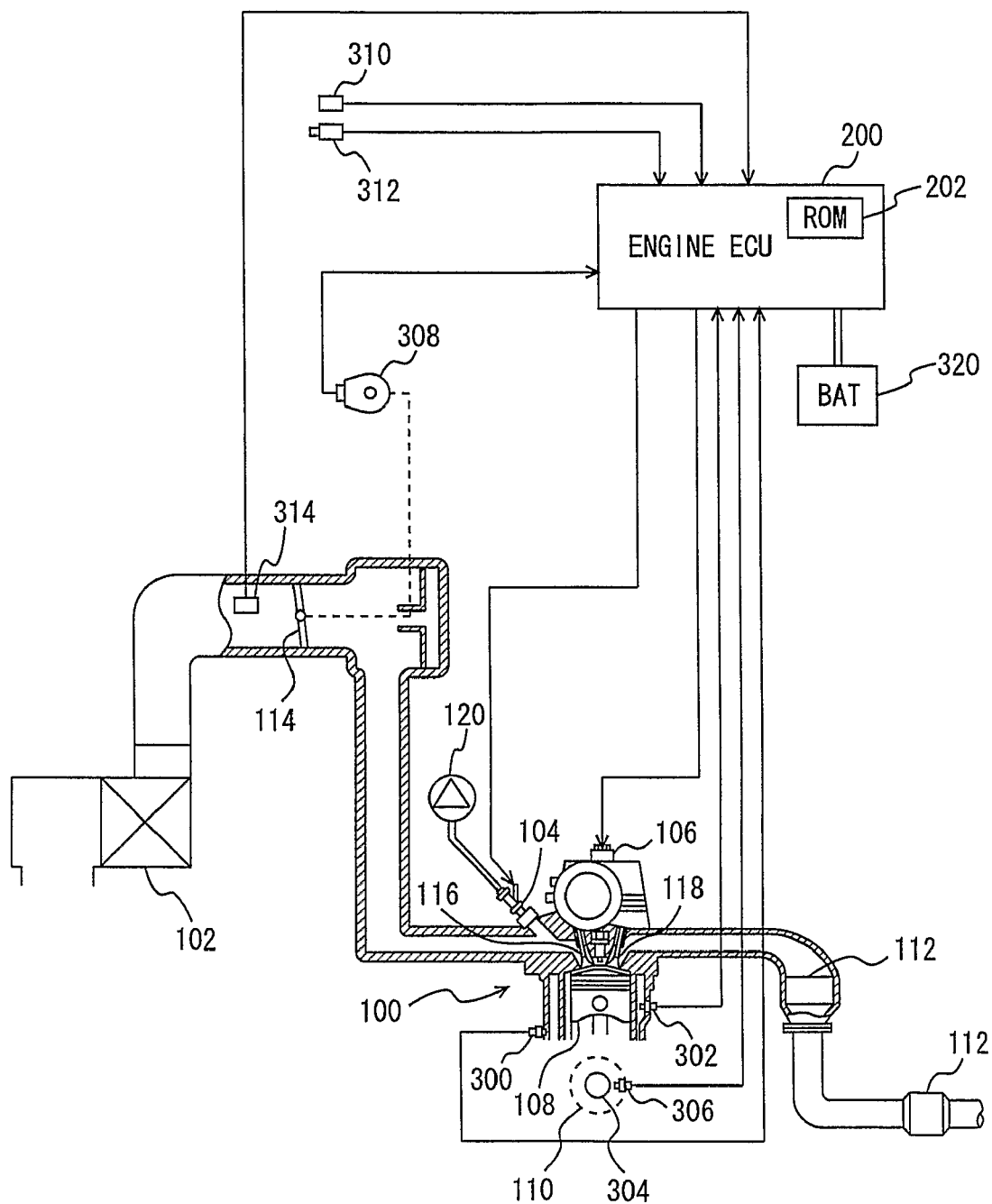
FIG. 1 is a schematic configuration diagram showing an engine controlled by an engine ECU as the knock determination device in accordance with an embodiment.

Embodiments of the present invention will be described in the following with reference to the figures. In the following description, the same components are denoted by the same reference characters. The names and functions are also the same. Therefore, detailed description thereof will not be repeated.

Referring to FIG. 1, an engine 100 of a vehicle mounting the knock determination device in accordance with an embodiment of the present invention will be described. Engine 100 is provided with a plurality of cylinders. The knock determination device in accordance with the present embodiment is realized by a program executed by an engine ECU (Electronic Control Unit) 200.

Engine 100 is an internal combustion engine, in which a mixture of air taken through an air cleaner 102 and a fuel injected by an injector 104 is ignited by a spark plug 106 and burned in a combustion chamber. Though timing of ignition is adjusted to attain MBT (Minimum advance for Best Torque) to maximize output torque, it is advanced or retarded in accordance with the state of operation of engine 100 when, for example, knocking occurs.

The burning of air-fuel mixture causes combustion pressure that presses a piston 108 down, whereby a crankshaft 110 rotates. The combusted air-fuel mixture (or exhaust gas) is purified by a three-way catalyst 112 and thereafter discharged outside the vehicle. The amount of air taken into engine 100 is adjusted by a throttle valve 114.

Engine 100 is controlled by engine ECU 200 having connected thereto a knock sensor 300, a water temperature sensor 302, a crank position sensor 306 arranged opposite to a timing rotor 304, a throttle open position sensor 308, a vehicle speed sensor 310, an ignition switch 312 and an air flow meter 314.

A knock sensor 300 is provided in a cylinder block of engine 100. Knock sensor 300 is implemented by a piezoelectric element. As engine 100 vibrates, knock sensor 300 generates a voltage having a magnitude corresponding to that of the vibration. Knock sensor 300 transmits a signal representing the voltage to engine ECU 200, Water temperature sensor 302 detects temperature of cooling water in engine 100 at a water jacket and transmits a signal representing a resultant detection to engine ECU 200.

Timing rotor 304 is provided at crankshaft 110 and rotates together with crankshaft 110. Timing rotor 304 is circumferentially provided with a plurality of protrusions spaced by a predetermined distance. Crank position sensor 306 is arranged opposite to the protrusions of timing rotor 304. When timing rotor 304 rotates, an air gap between the protrusions of timing rotor 304 and crank position sensor 306 varies, so that magnetic flux passing through a coil portion of crank position sensor 306 increases/decreases, thus generating electromotive force at the coil portion. Crank position sensor 306 transmits a signal representing the electromotive force to engine ECU 200. From the signal transmitted from crank position sensor 306, engine ECU 200 detects a crank angle and rotation number of crankshaft 110.

Throttle open position sensor 308 detects a throttle open position and transmits a signal representing a resultant detection to engine ECU 200. Vehicle speed sensor 310 detects number of rotations of a wheel (not shown) and transmits a signal representing a resultant detection to engine ECU 200. From the number of rotations of the wheel, engine ECU 200 calculates the vehicle speed. Ignition switch 312 is turned on by a driver, for starting engine 100. Air flow meter 314 detects amount of air taken into engine 100, and transmits a signal representing a resultant detection to engine ECU 200.

Engine ECU 200 operates with electric power fed from an auxiliary battery 320 as a power source. Engine ECU 200 uses the signals transmitted from various sensors and ignition switch 312 as well as maps and programs stored in ROM (Read Only Memory) 202 to perform an operation to control equipment so that engine 100 attains a desired driving condition.

In the present embodiment, using a signal transmitted from knock sensor 300 and a crank angle, engine ECU 200 detects a waveform of vibration (hereinafter referred to as "vibration waveform") of engine 100 at a predetermined knock detection gate (a section from a predetermined first crank angle to a predetermined second crank angle) and from the detected vibration waveform determines whether knock has occurred in engine 100. The knock detection gate of the present embodiment is from the top dead center (0°) to 90° in a combustion stroke. It is noted that the knock detection gate is not limited thereto.

When knocking occurs inside a cylinder of engine 100, in-cylinder pressure resonates. This resonance of in-cylinder pressure causes the cylinder block of engine 100 to vibrate. Thus, the vibration of the cylinder block, that is, the frequency of the vibration detected by knock sensor 300 is often included in an in-cylinder pressure resonance frequency band.

The in-cylinder pressure resonance frequency corresponds to the resonance mode of an in-cylinder air column. The frequency bands where a vibration specific to knocking appears representatively include the first, second, third, and fourth order tangential mode frequency bands.

Figure 2:
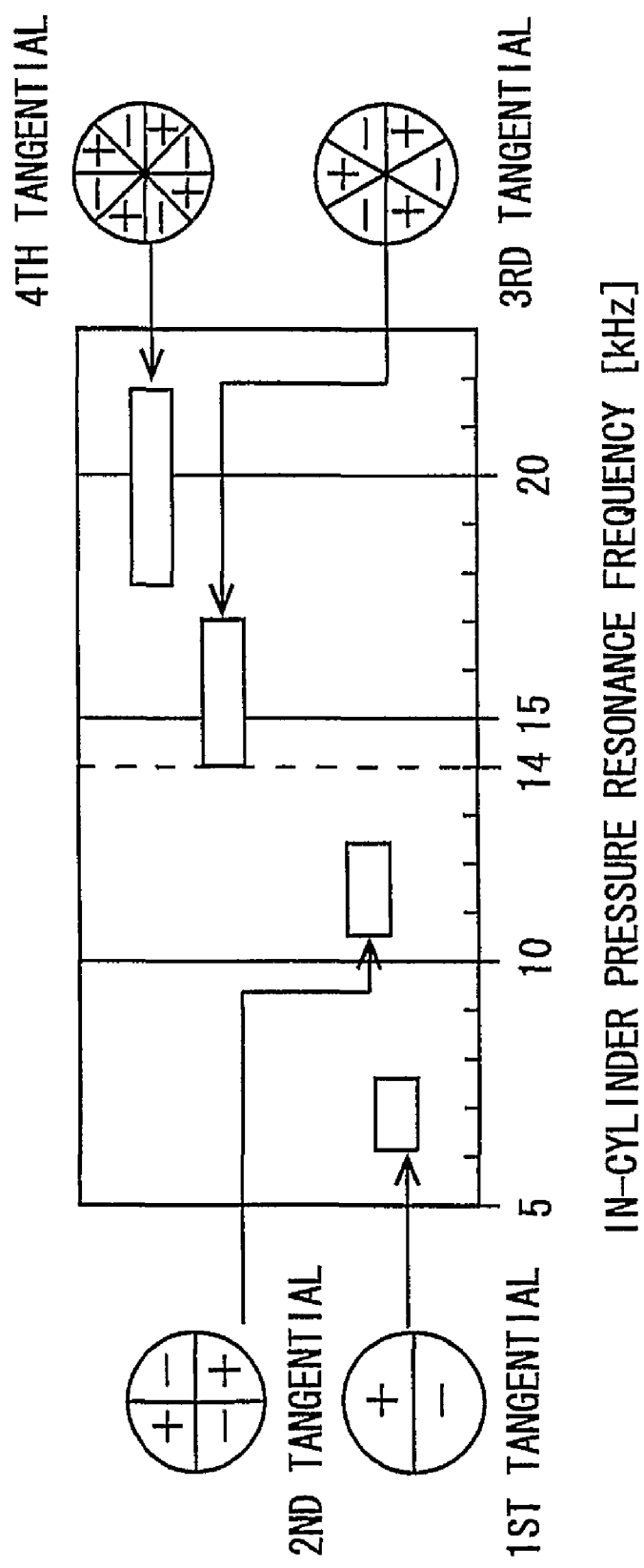
FIG. 2 is a (first) illustration showing frequency band of in-cylinder pressure vibration.

The in-cylinder pressure resonance frequency is calculated from a resonance mode, a bore diameter and a sonic speed. FIG. 2 shows one example of the in-cylinder pressure resonance frequency for each resonance mode with a constant sonic speed and bore diameters varying from X to Y. As shown by FIG. 2, the in-cylinder pressure resonance frequency becomes higher in ascending order of the first order tangential, second order tangential, first order radial, third order tangential, and fourth order tangential frequency bands.

FIG. 2 shows the in-cylinder pressure resonance frequency provided when knocking occurs. After knocking occurs, the volume of the combustion chamber increases as the piston is lowered, and hence the temperature and the pressure inside the combustion chamber decrease. As a result, the sonic speed decreases, and the in-cylinder pressure resonance frequency decreases. Accordingly, as shown in FIG. 3, as the crank angle increases from ATDC (After Top Dead Center), the peak component of the frequency of the in-cylinder pressure decreases.

Due to the resonance of the in-cylinder pressure having such characteristics, the cylinder block vibrates. Therefore, in an ignition cycle where knocking has occurred, the vibrations detected by knock sensor 300 include a vibration of a frequency band A that is the same as the first order tangential resonance mode frequency band, a vibration of a frequency band B that is the same as the second order tangential resonance mode frequency band, a vibration of a frequency band C that is the same as the third order tangential frequency band, and a vibration of a frequency band D that is the same as the fourth order tangential resonance mode frequency band.

Figure 3:
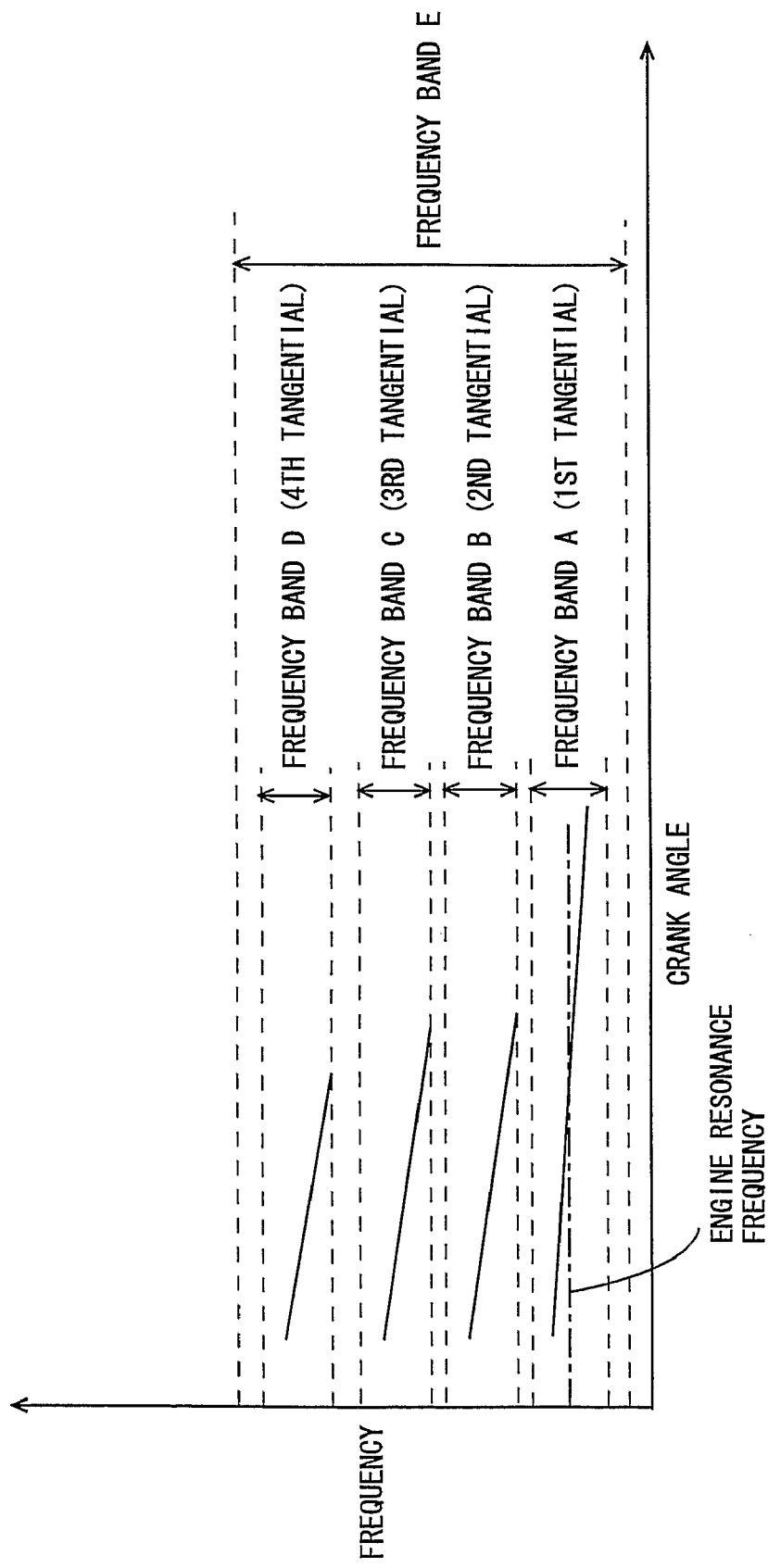
FIG. 3 shows frequency bands of vibration detected by the knock sensor.

As shown in FIG. 3, the first order tangential resonance mode frequency band A includes the resonance frequencies of the cylinder block, piston 108, the conrod, the crankshaft 110 and the like. Therefore, even if knocking does not occur, there appears in frequency band A a vibration caused inevitably as injector 104, piston 108, intake valve 116, exhaust valve 118, pump 120 compressing and thus delivering fuel to injector 104, and the like operate.

In view of the foregoing, the present embodiment is characterized in that engine ECU 200 extracts vibrations of frequency bands A, B, D and E from frequencies detected by knock sensor 300 and changes weight among vibration intensities of extracted frequency bands A to D such that influence of noise other than knocking becomes smaller.

Specifically, weight is changed such that, among the vibration intensities of extracted frequency bands A to D, the ratio of vibration intensity of at least one frequency band having influence on knock determination greater than a prescribed degree caused by superposition of noise other than knocking is reduced. In the present embodiment, weight is changed such that the weight on vibration in frequency band A of first tangential mode becomes smaller than the weights on vibrations in other frequency bands B to D. This prevents false determination of knocking.

If the bandwidth for detecting vibration is narrow, it is possible to reduce noise component included in the detected vibration intensity, while characteristic portions (such as vibration occurrence timing and attenuation rate) of the noise component are removed from the vibration waveform. In such a case, a waveform not including the noise component, that is, a waveform similar to a vibration waveform at the time of knocking, would be detected, even though the vibration is actually derived from the noise component. Therefore, it becomes difficult to distinguish in the vibration waveform the vibration caused by knocking from the vibration caused by noise.

Therefore, in the present embodiment, in order to determine whether knocking has occurred or not taking noise into consideration when noise is generated, vibration in a wide frequency band E covering frequency bands A to D entirely, is detected to encompass noises. The vibration in frequency band E is used for detecting the vibration waveform of engine 100.

The vibration waveform in frequency band E when knock occurs has such a shape that the vibration moderately attenuates after the peak value of vibration waveform. If knock has not occurred but vibration is caused by noise, the vibration waveform comes to have a dome shape. Therefore, from the vibration waveform in frequency band E, it is possible to distinguish vibration caused by knocking from vibration caused by noise, with high accuracy.

Figure 4:
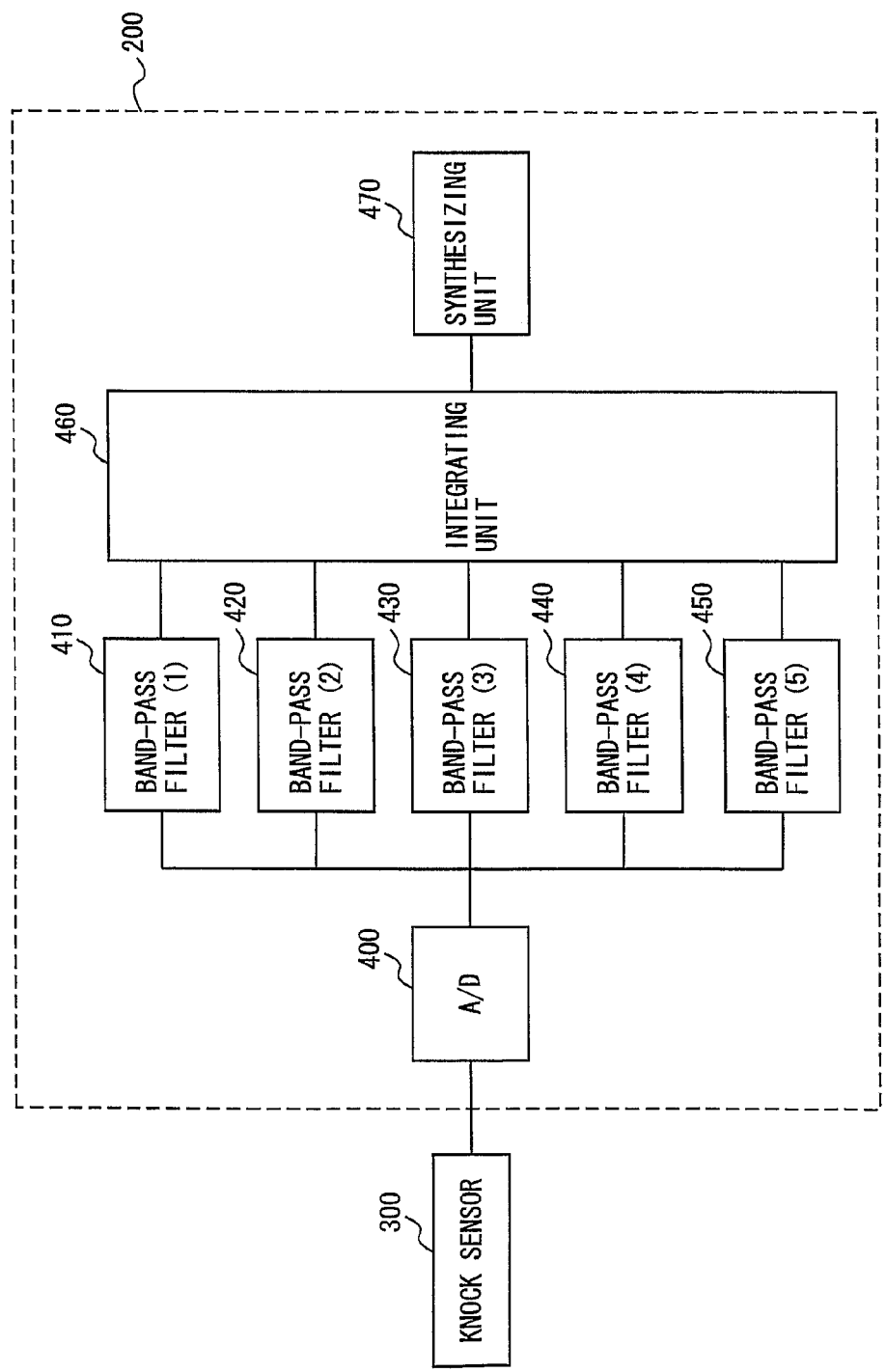
FIG. 4 is a control block diagram showing the engine ECU of FIG. 1.

Referring to FIG. 4, engine ECU 200 will further be described. Engine ECU 200 includes an A/D (analog/digital) converting unit 400, a band-pass filter (1) 410, a band-pass filter (2) 420, a band-pass filter (3) 430, a band-pass filter (4), a band-pass filter (5) 450 and an integrating unit 460.

A/D converting unit 400 converts an analog signal transmitted from knock sensor 300 to a digital signal. Band-pass filter (1) 410 passes only the signal in the first frequency band A of the signals transmitted from knock sensor 300. Specifically, of the vibrations detected by knock sensor 300, only the vibrations in the first frequency band A are extracted by band-pass filter (1) 410.

Band-pass filter (2) 420 passes only the signal in the second frequency band B of the signals transmitted from knock sensor 300. Specifically, of the vibrations detected by knock sensor 300, only the vibrations in the second frequency band B are extracted by band-pass filter (2) 420.

Band-pass filter (3) 430 passes only the signal in the third frequency band C of the signals transmitted from knock sensor 300. Specifically, of the vibrations detected by knock sensor 300, only the vibrations in the third frequency band C are extracted by band-pass filter (3) 430.

Band pass filter (4) 440 passes only a signal of frequency band D among the signals transmitted from knock sensor 300. That is, by band pass filter (4) 440, only the vibrations of frequency band D are extracted from the vibrations detected by knock sensor 300. It is noted that band pass filter (4) 440 may extract, as the vibration of frequency band D, the vibration in frequency band of second tangential first radial mode, in place of fourth tangential mode.

Band pass filter (5) 450 passes only a signal of frequency band E among the signals transmitted from knock sensor 300. That is, by band pass filter (5) 450, only the vibrations of frequency band E are extracted from the vibrations detected by knock sensor 300.

Integrator 460 integrates the signal selected by each of band-pass filters (1) 410 to (5) 450, that is, the vibration intensity, for a crank angle of every five degrees. Hereinafter, the value obtained from the integration is referred to as an integrated value. The integrated value is calculated for each frequency band.

A synthesizing unit 470 adds, among the integrated values calculated by integrator 460, the integrated values of frequency bands A to D in correspondence with the crank angles. In the present embodiment, synthesizing unit 470 multiplies each of the calculated integrated values of frequency bands A to D by weight coefficients corresponding to each frequency band, and adds the integrated values of frequency bands A to D in correspondence with the crank angles. In this manner, the vibration waveforms of frequency bands A to D are synthesized. Further, the integrated value of frequency band E is used as the vibration waveform of engine 100.

In the present embodiment, description will be given assuming that the weight coefficient corresponding to frequency band A is "0.5" and weight coefficients corresponding to other frequency bands B to D are all "1.0". The values, however, are not limited to these and may be appropriately selected through an experiment or the like, as long as the weight coefficient for frequency band A is smaller than those corresponding to frequency bands B to D.

Figure 5:
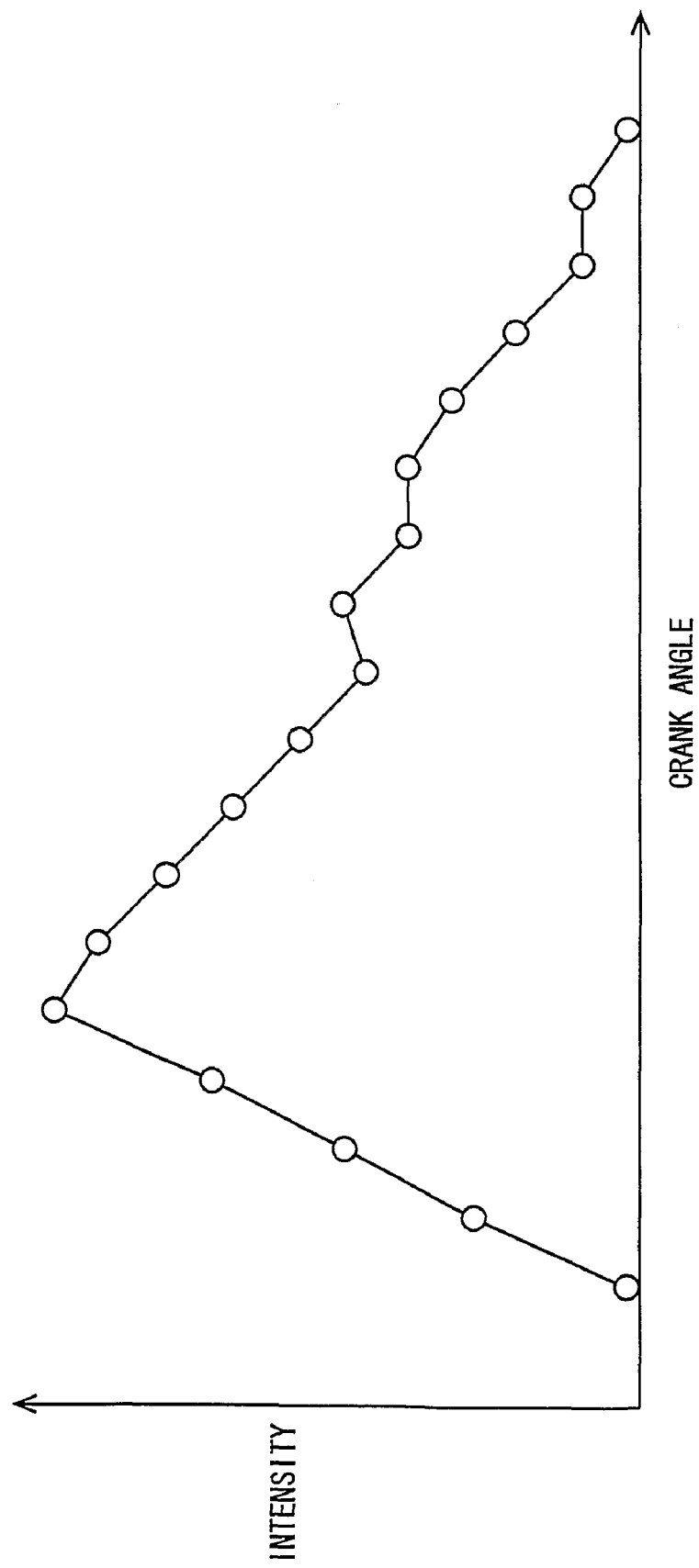
FIG. 5 shows engine vibration waveform.
Figure 6:
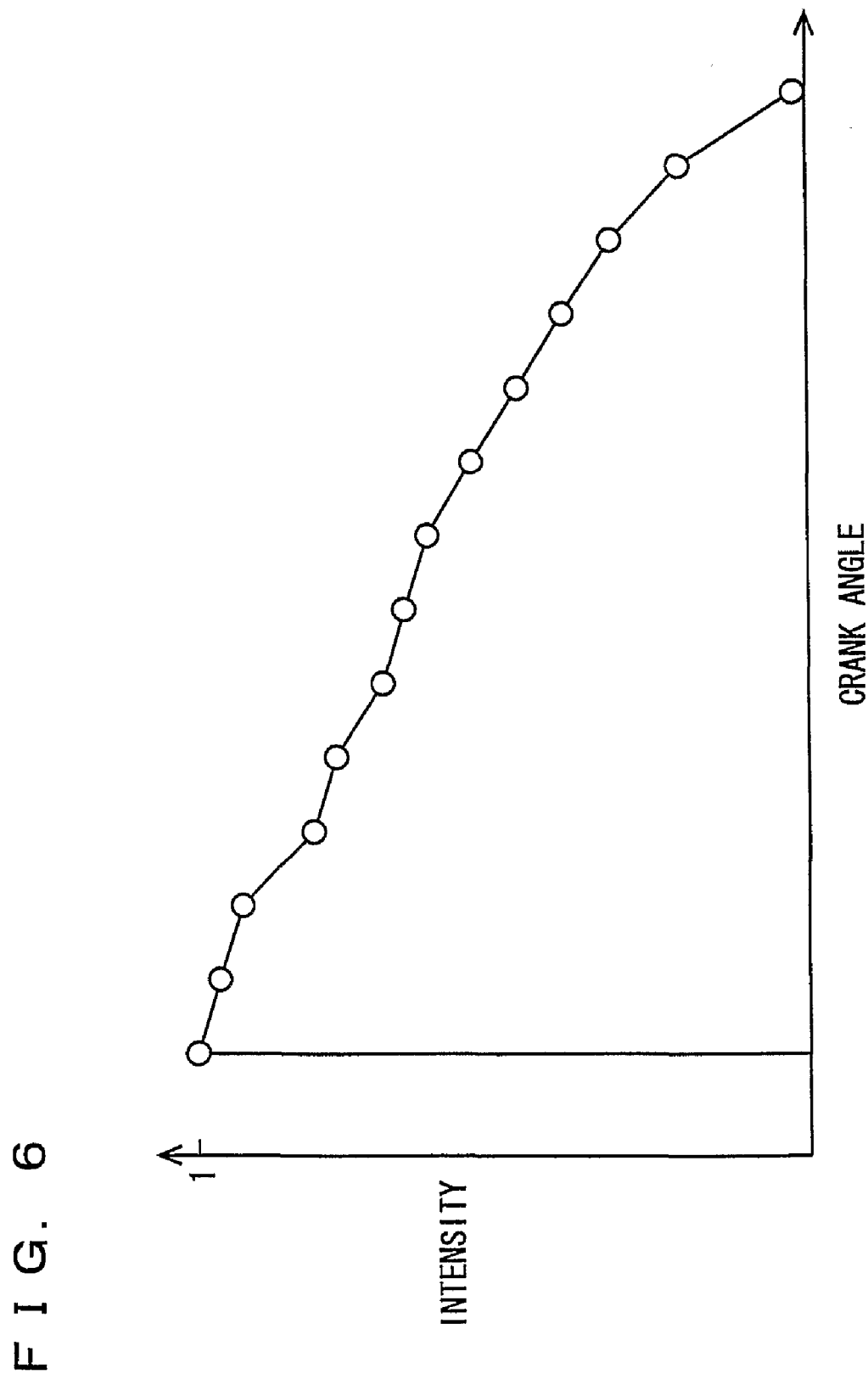
FIG. 6 shows a knock waveform model stored in a ROM of engine ECU.
Figure 7:
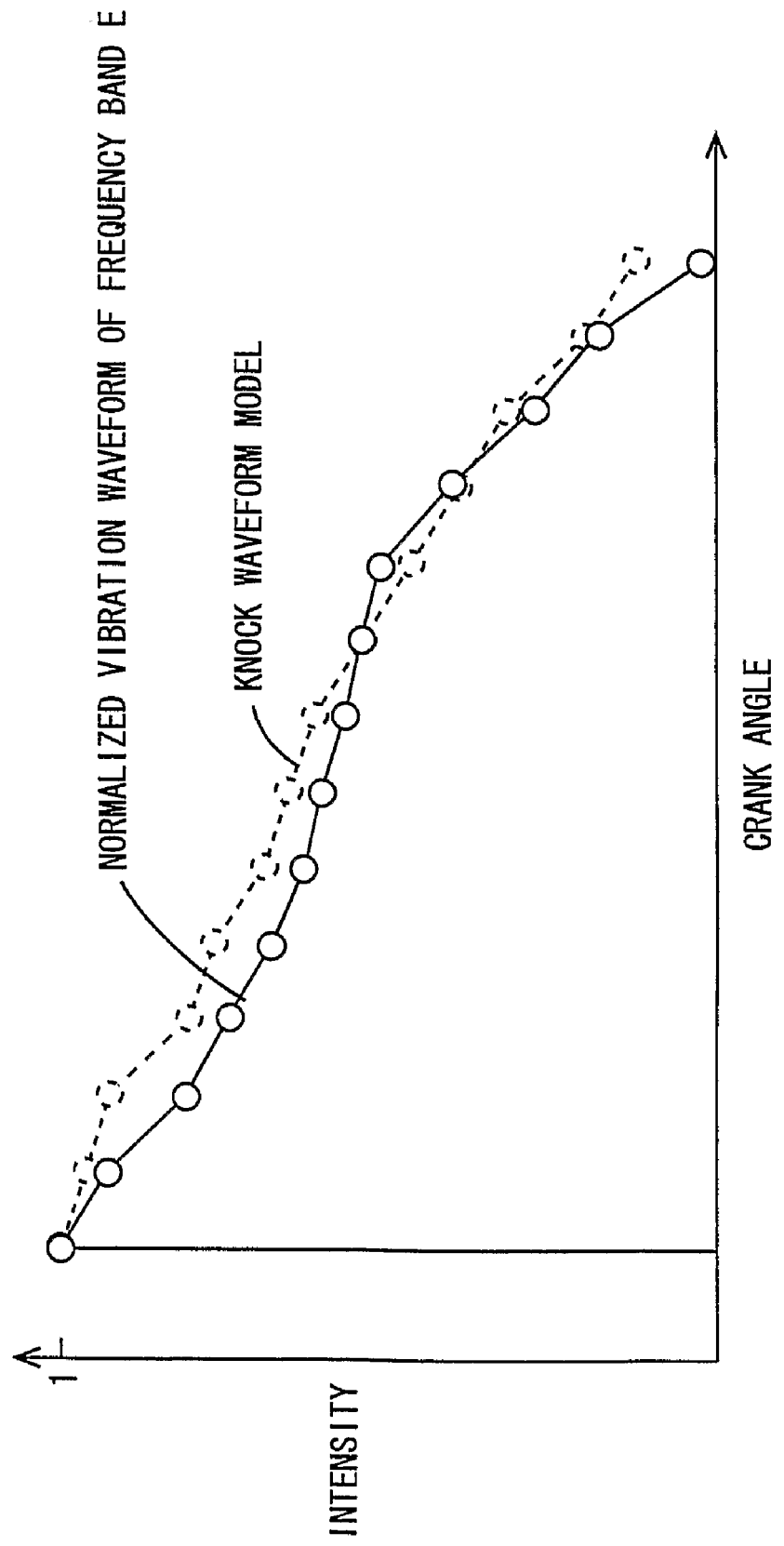
FIG. 7 is a (first) diagram comparing the vibration waveform and the knock waveform model.

The vibration waveform of frequency band E shown in FIG. 5 is compared with the knock waveform model shown in FIG. 6, and whether knock has occurred or not is determined. The knock waveform model is a model of vibration waveform where engine 100 knocks, and determined in advance as a reference of vibration waveform of engine 100. The knock waveform model is stored in a memory 202 of engine ECU 200.

In the knock waveform model, magnitude of vibration is represented by a dimensionless number of 0 to 1 and does not uniquely correspond to a crank angle. More specifically, for the knock waveform model of the present embodiment, while it is determined that the vibration intensity decreases as the crank angle increases after the peak value of vibration intensity, the crank angle at which the vibration intensity assumes the peak value is not determined.

The knock waveform model of the present embodiment corresponds to the vibration after the peak intensity of vibration generated by knocking. A knock waveform model that corresponds to vibration after the rise of vibration caused by knocking may be stored.

The knock waveform model is formed and stored in advance based on a vibration waveform of engine 100 detected when knocking is forced by an experiment or the like. The knock waveform model is formed by using an engine 100 (hereinafter referred to as central characteristic engine) of which size and output value of knock sensor 300 are the central values of size tolerance and output tolerance of knock sensor 300. In other words, the knock waveform model is the vibration waveform obtained when knocking is forced in the central characteristic engine. The method of forming the knock waveform model is not limited thereto, and it may be formed, by way of example, by simulation.

Engine ECU 200 compares the detected waveform and the stored knock waveform model, and determines whether knock has occurred in engine 100 or not.

In comparing the detected waveform and the stored knock waveform model, the largest integrated value (peak value) of the integrated values of synthesized waveform of frequency bands A to D is calculated. Further, the position of peak value (crank angle) in the synthesized waveform of frequency bands A to D is detected. In the following, the peak value position in the synthesized waveform of frequency bands A to D will be referred to as the "peak position (1)".

In a prescribed range (crank angle) from the peak position (1), the position of peak value in frequency band E is detected. In the following, the peak value position of frequency band E will be referred to as "peak position (2)".

In the present embodiment, peak position (2) is detected in a range preceding peak position (1). By way of example, peak position (2) is detected from among the positions of three integrated values preceding peak position (1). The position of integrated value of frequency band E that is the largest in the range before peak value (1) is detected as peak position (2). The range of detection of peak position (2) is not limited to this, and it may be detected in a range following peak position (1).

In the comparison between the detected waveform and the knock waveform model, a normalized waveform and the knock waveform model are compared, as shown in FIG. 6. Here, normalization refers, for instance, to representation of vibration intensity by a dimensionless number of 0 to 1, by dividing each integrated value by the maximum integrated value of the detected vibration waveform. The method of normalization is not limited thereto.

In the present embodiment, engine ECU 200 calculates a correlation coefficient K representing the degree of similarity of the normalized vibration waveform to the knock determination model (representing deviation between the vibration waveform and the knock determination model). The timing at which vibration intensity of the normalized vibration waveform peaks is matched with a timing at which the vibration intensity of knock waveform model peaks, and in this state, absolute value in difference (amount of deviation) between the intensity of normalized vibration waveform and the intensity of knock waveform model is calculated crank angle by crank angle (at every 5 degrees), whereby the coefficient of correlation K is calculated. It may be possible to calculate the absolute value of difference in intensity of vibration waveform and the intensity of knock waveform model crank angle by crank angle other than 5 degrees.

Let us represent the absolute value of difference between the normalized vibration waveform and the knock waveform model for each crank angle by $\Delta S(I)$ (where I is a natural number), and the sum of differences at every crank angle between the vibration intensity of knock waveform model and the positive reference value, that is, the area of knock waveform model occupied by the intensity not lower than the reference value, by S. The correlation coefficient K is calculated as $$K=(S-\Sigma \Delta S(I))/S \qquad (1)$$

where $\Sigma \Delta S(I)$ represents a sum of $\Delta S(I)$s at the crank angle at which the vibration waveform and the knock waveform model are compared. As the reference value used for calculating the area S of knock waveform model, the minimum value of intensity of vibration waveform in the crank angle range, in which comparison with the knock waveform model is performed and the difference between the intensity of vibration waveform and the intensity of knock waveform model is calculated, is used. A value other than the minimum intensity value of vibration waveform may be used as the reference value, provided that the value is positive. Note that the coefficient of correlation K may be calculated by a different method.

Further, engine ECU 200 calculates a knock intensity N based on the integrated value (hereinafter referred to as 90-degrees integrated value) of a predetermined crank angle (from 0 to 90 degrees) in the synthesized waveform of frequency bands A to D. When we represent the 90-degrees integrated value by P and the value representing the intensity of vibration of engine 100 while engine 100 is not knocking by BGL (Back Ground Level), the nock intensity N is calculated by the equation N=P/BGL. BGL is determined in advance through simulation or experiment and stored in ROM 202. Note that the knock intensity N may be calculated by a different method.

In the present embodiment, engine ECU 200 compares the calculated knock intensity N with the determination value V(KX) stored in ROM 202, and further compares the detected waveform with the stored knock waveform model, and determines for every one ignition cycle whether knock has occurred in engine 100 or not.

Figures 8, 9:
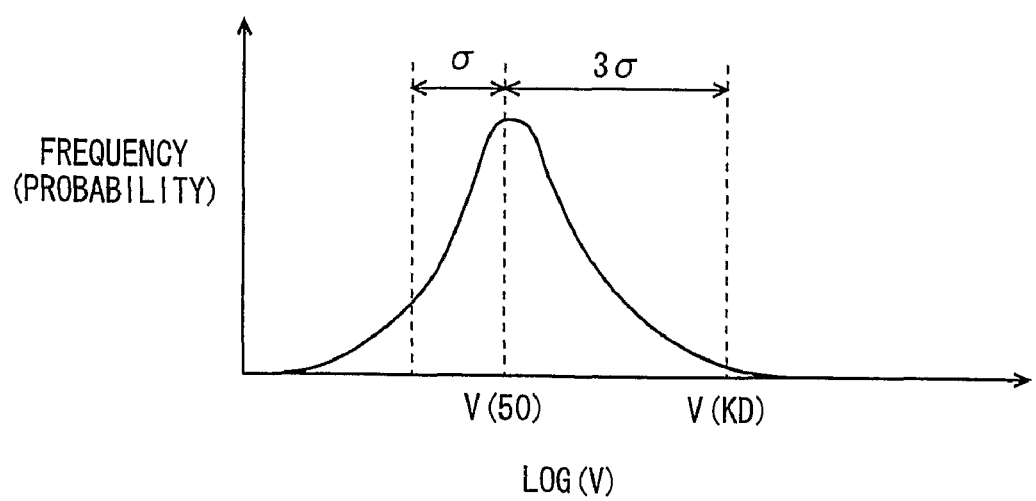
FIG. 8 shows a map of determination values V(KX) stored in the ROM of engine ECU.
FIG. 9 shows frequency distribution of intensity LOG(V).

As shown in FIG. 8, the determination value V(KX) is stored as a map, for each of the ranges divided by the state of operation using engine speed NE and intake air amount KL as parameters. In the present embodiment, nine ranges are provided for each cylinder, by the division in accordance with low speed (NE<NE(1)), middle speed (NE(1)≦NE<NE(2)), high speed (NE(2)≦NE), low burden (KL<KL(1)), middle burden (KL(1)≦KL<KL(2)) and high burden (KL(2)≦KL). The number of ranges is not limited thereto. Further, ranges may be divided using a parameter or parameters other than the engine speed NE and intake air amount KL.

At the time of shipment of engine 100 or the vehicle, a value determined in advance through an experiment or the like is used as the determination value V(KX) (initial determination value V(KX) at shipment) stored in ROM 202. Dependent on variation in output values or degradation of knock sensor 300, detected intensity may possibly vary even if the vibration occurring in engine 100 is the same. In that case, it is necessary to correct the determination value V(KX) and to determine whether knock has occurred or not using the determination value V(KX) appropriate for the actually detected intensity.

Therefore, in the present embodiment, a knock determination level V(KD) is calculated based on a frequency distribution representing relation between an intensity value LOG(V) obtained by logarithmic conversion of intensity V and frequency (number of times, or probability) of detection of each intensity value LOG(V).

For every range defined by the engine speed NE and the intake air amount KL as parameters, the intensity value LOG (V) is calculated. The intensity V used for calculating intensity value LOG(V) is the integrated value between predetermined crank angles (integrated value from 0 to 90 degrees) of the synthesized waveform of frequency bands A to D. Based on the calculated intensity value LOG(V), the median V(50) at which the frequency of intensity value LOG(V) accumulated from the minimum value attains 50% is calculated. Further, standard deviation σ of intensity value LOG(V) not larger than the median V(50) is calculated. By way of example, in the present embodiment, the median V(50) and standard deviation σ, which are approximated to the median and standard deviation calculated based on a plurality (for example, 200 cycles) of intensity values LOG(V), are calculated by the following method, cycle by cycle of ignition.

If the intensity value LOG(V) detected at present is larger than the median V(50) calculated last time, a value obtained by adding a predetermined value. C(1) to the median (50) calculated last time is provided as the median V(50) this time. On the contrary, if the intensity value LOG(V) detected at present is smaller than the median V(50) calculated last time, a value obtained by subtracting a predetermined value C(2) (by way of example, the value C(2) may be the same as C(1)) from the median (50) calculated last time is provided as the median V(50) this time.

If the intensity value LOG(V) detected this time is smaller than the median V(50) calculated last time and larger than a value obtained by subtracting the standard deviation σ calculated last time from the median V(50) calculated last time, a value obtained by subtracting double a predetermined value C(3) from the standard deviation σ calculated last time is provided as the standard deviation σ this time. On the contrary, if the intensity value LOG(V) detected at present is larger than the median V(50) calculated last time, or if it is smaller than the value obtained by subtracting the standard deviation σ calculated last time from the median V(50) calculated last time, a value obtained by adding a predetermined value C(4) (by way of example, the value C(4) may be the same as C(3)) to the standard deviation σ calculated last time is provided as the standard deviation σ this time. The median V(50) and the standard deviation σ may be calculated by other methods. Further, initial values of the median V(50) and the standard deviation σ may be preset values, or "0".

Using the median V(50) and the standard deviation σ, the knock determination level V(KD) is calculated. As shown in FIG. 9, a value obtained by adding a product of a coefficient U(1)(U(1) is a constant and, for example, U(1)=3) and standard deviation σ to the median V(50) is provided as the knock determination level V(KD). The knock determination level V(KD) may be calculated by a different method.

The ratio (frequency) of intensity values LOG(V) larger than the knock determination level V(KD) is determined to be the frequency of knocking, and counted as knock occupation ratio KC.

If the knock occupation ratio KC is larger than a threshold value KC(0), the determination value V(KX) is corrected to be smaller by a predetermined correction amount, so that frequency of retarding ignition timing increases. The corrected determination value V(KX) is stored in SRAM.

If the knock occupation ratio KC is smaller than a threshold value KC(0), the determination value V(KX) is corrected to be larger by a predetermined correction amount, so that frequency of advancing ignition timing increases.

The coefficient U(1) is a coefficient found from data and knowledge obtained through experiment or the like, The intensity value LOG(V) larger than the knock determination level when U(1)=3 is substantially equal to the intensity value LOG(V) of the ignition cycle in which knock actually occurred. A value other than "3" may be used as coefficient U(1).

The frequency distribution based on the plurality of intensity values LOG(V) is obtained based on the frequency distribution of a plurality of vibration intensities in each of the frequency bands A to D, Specifically, the frequency distribution based on the plurality of intensity values LOG(V) is obtained based on the sum of frequency distributions of the plurality of vibration intensities in the frequency bands A to D.

If the weight coefficient corresponding to frequency band A is set to be "0.5", the median of frequency distribution of the plurality of vibration intensities in the frequency band A could be deviated from the median of frequency distribution of the plurality of vibration intensities in other frequency bands B to D. Further, output intensity detected among frequency bands A to D varies. Further, among frequency bands, some are much susceptible to superposition of knocking, while others are less susceptible. Therefore, accuracy of resulting frequency distribution of intensity values LOG(V) may possibly be degraded. Therefore, in the present embodiment, frequency distributions corresponding to frequency bands A to D are each corrected based on the median of intensity of vibration intensity frequency distribution of frequency bands A to D.

Figure 10:
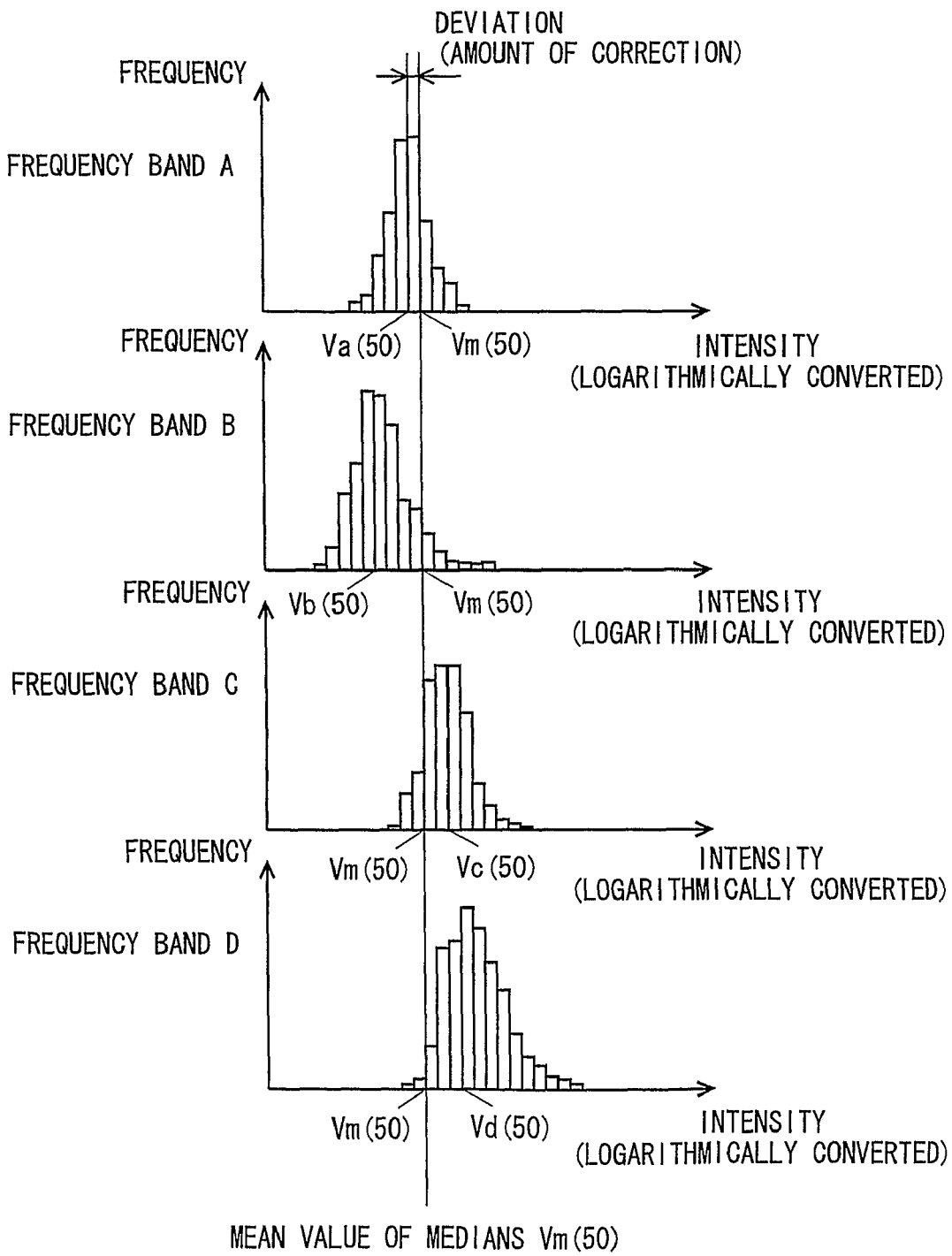
FIG. 10 includes graphs showing vibration intensity frequency distributions of various frequency bands.

Specifically, if the frequency distributions of frequency bands A to D are as shown in FIG. 10, the frequency distributions are corrected using a mean value of medians of frequency bands A to D as a reference value. Specifically, using the amount of deviation between the mean of medians and the median of each of the frequency bands A to D as an amount of correction, the frequency distributions of frequency bands A to D are corrected.

Figure 11:
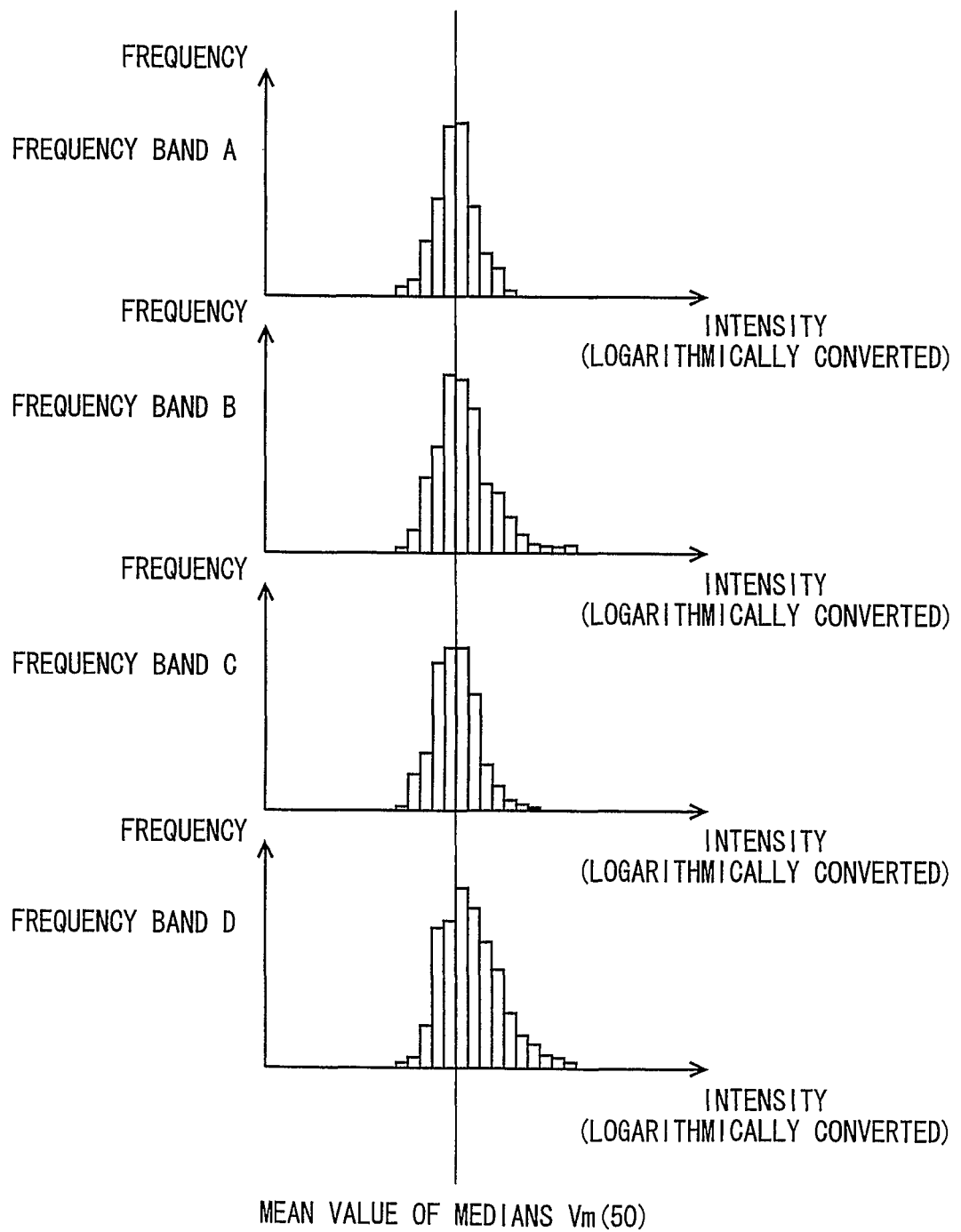
FIG. 11 includes graphs showing vibration intensity frequency distributions of various frequency bands after correction.

By way of example, assume that the median calculated in the frequency distribution of frequency band A is Va(50) and the mean value of medians of frequency bands A to D is Vm(50). Here, the amount of deviation between the mean value of medians and the median of frequency distribution of frequency band A is given as Vm(50) Va(50). Therefore, by adding the amount of deviation Vm(50)–Va(50) to each intensity value of frequency distribution of frequency band A, the median value of frequency distribution of frequency band A is corrected to Vm(50). Similarly, the median values Vb(50), Vc(50) and Vd(50) calculated for frequency distribution of frequency bands B to D are corrected to Vm(50). In this manner, mean values of frequency distributions of frequency bands A to D are corrected to be substantially equal to each other, as shown in FIG. 11. Based on the corrected frequency distributions of frequency bands A to D, frequency distribution of a plurality of vibration intensity values LOG(V) is obtained and, therefore, degradation in accuracy can be prevented.

Figure 12:
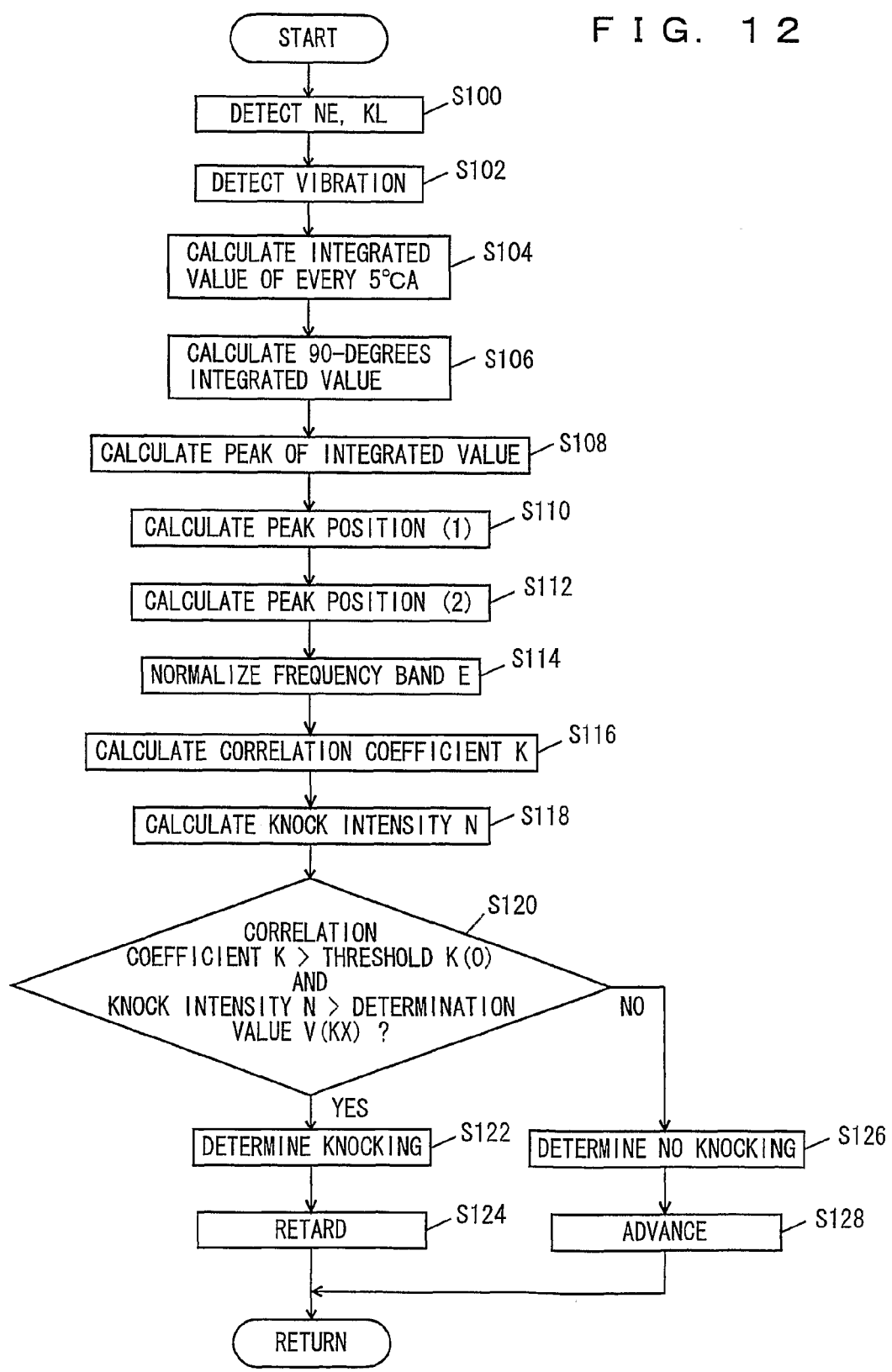
FIG. 12 is a flowchart representing a control structure of a program executed by the engine ECU as the knock determination device of an internal combustion engine in accordance with the embodiment.

Referring to FIG. 12, control structure of a program executed by engine ECU 200 as the knock determination device in accordance with the present embodiment to determine whether or not knock has occurred and thereby to control ignition timing cycle by cycle of ignition will be described.

At step (hereinafter represented as S) 100, engine ECU 200 detects engine speed NE based on the signal transmitted from crank position sensor 306 and detects amount of intake air KL based on the signal transmitted from air flow meter 314.

At S102, engine ECU 200 detects the vibration intensity of engine 100 from a signal transmitted from knock sensor 300. The vibration intensity is represented by a value of voltage output from knock sensor 300. Note that the vibration intensity may be represented by a value corresponding to the value of the voltage output from knock sensor 300. The vibration intensity is detected in a combustion stroke for an angle from a top dead center to 90° (a crank angle of 90°).

At S104, engine ECU 200 calculates integrated value of voltage output from knock sensor 300 (i.e., representing intensity of vibration), for a crank angle of every five degrees (integrated for only 5 degrees). The integrated value is calculated frequency band by frequency band. At this time, integrated values of frequency bands A to D are multiplied by the weight coefficients corresponding to respective frequency bands, and added in correspondence with the crank angle (waveform is synthesized). Further, the integrated value of frequency band E is calculated, whereby the vibration waveform of engine 100 is detected.

At S106, engine ECU 200 calculates 90-degrees integrated value of the synthesized waveform of frequency bands A to D. At S108, engine ECU 200 calculates the largest integrated value (peak value) among the integrated values of the synthesized waveform of frequency bands A to D. At S110, peak position (1) of the synthesized waveform of frequency bands A to D is detected.

At S112, engine ECU 200 detects peak position (2) in frequency band E, in a predetermined range (crank angle) from the position of peak value (crank angle).

At S114, engine ECU 200 normalizes the integrated value (vibration waveform of engine 100) of frequency band E. Here, normalization refers, for instance, to representation of vibration intensity by a dimensionless number of 0 to 1, by dividing each integrated value by the peak value calculated at S108. The method of normalization is not limited to this and, by way of example, each integrated value may be divided by the integrated value at peak position (2).

At S116, engine ECU 200 calculates the coefficient of correlation K, which is the value related to the deviation between the normalized vibration waveform and the knock waveform model. Peak position (2) is matched with the position (timing) at which the vibration intensity of knock waveform model peaks, and in this state, absolute value in difference (amount of deviation) between the intensity of normalized vibration waveform and the intensity of knock waveform model is calculated crank angle by crank angle (at every 5 degrees), whereby the coefficient of correlation K is calculated.

When we represent the absolute value of difference between the normalized vibration waveform and the knock waveform model for each crank angle by $\Delta S(I)$ (where I is a natural number) and the value obtained by integrating the vibration intensity of knock waveform model for the crank angle (area of knock waveform model) by S, the coefficient of correlation K is calculated by the equation $K=(S-\Sigma\Delta S(I))/S$, where $\Delta\Sigma S(I)$ represents a sum of $\Delta S(I)$s. The coefficient of correlation K may be calculated by a different method.

At S118, engine ECU 200 divides the 90-degrees integrated value by BGL and calculates knock intensity N. At S120, engine ECU 200 determines whether the coefficient of correlation K is larger than the threshold value K(0) or not and whether knock intensity N is larger than the determination value V(KX) or not. If the coefficient of correlation K is larger than the threshold value K(0) and the knock intensity N is larger than the determination value V(KX) (YES at S120), the process proceeds to S122. If not (NO at S120), the process proceeds to S126.

Here, Equation (1) above can be modified to $$K=1-\Sigma\Delta S(I)/S \quad (2).$$

Further, Equation (2) can be modified to $$\Sigma\Delta S(I)/S=1-K \quad (3).$$

Therefore, that the coefficient of correlation K is larger than the threshold value K(0) means that $\Sigma\Delta S(I)/S$ is smaller than $1-K(0)$.

At S122, engine ECU 200 determines that knock has occurred in engine 100. At S124, engine ECU 200 retards the ignition timing.

At S126, engine ECU 200 determines that knock has not occurred. At S128, engine ECU 200 advances the ignition timing.

An operation of engine ECU 200 as the knock determination device according to the present embodiment based on the above-described configuration and flowchart will be described.

While engine 100 is in operation, engine speed NE is detected based on the signal transmitted from crank position sensor 306, and the amount of intake air KL is detected based on the signal transmitted from air flow meter 314 (S100). Further, vibration intensity of engine 100 is detected based on the signal transmitted from knock sensor 300 (S102).

In a combustion stroke for a range from the top dead center to 90°, the integrated value for every five degrees is calculated for vibrations of each of the frequency bands A to E (S104).

Figure 13:
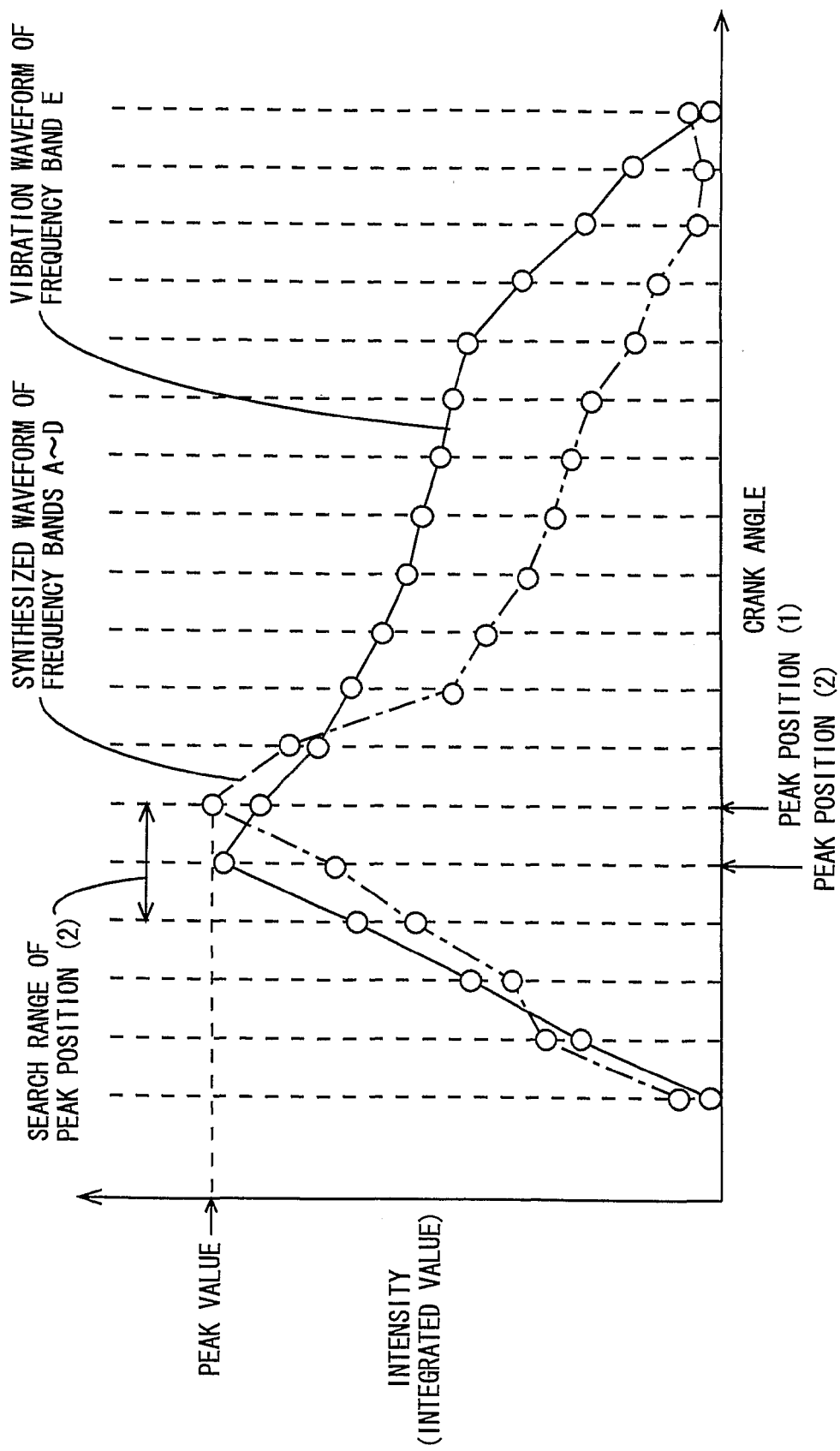
FIG. 13 is a graph showing comparison between the normalized vibration waveform and the knock waveform model.

At this time, integrated values of frequency bands A to D are multiplied by predetermined coefficients corresponding to respective frequency bands A to D, and added, whereby the vibration waveform is synthesized as represented by a chain-dotted line in FIG. 13. Further, the integrated value of frequency band E represented by a solid line in FIG. 13 is used as the vibration waveform of engine 100. Further, 90-degrees integrated values of frequency bands A to D are calculated (S106).

As an integrated value provided for every five degrees is used to detect a vibration waveform, it becomes possible to detect a vibration waveform of which delicate variations are suppressed. This makes it easier to compare the detected vibration waveform with the knock waveform model.

The calculated integrated values are used to calculate peak value P of the integrated values in the synthesized waveform of frequency bands A to D (S108). The position of peak value P, or peak position (1), is detected (S110). Herein, as shown in FIG. 13, peak position (1) is assumed to have a sixth position as counted from the left, (the position of the integrated value for 25-30 degrees).

Peak position (2) is detected from the positions of three integrated values preceding peak position (1) (the fourth to sixth integrated values from the left) (S112). More specifically, of the positions of the fourth, fifth and sixth integrated values as counted from left in frequency band E, the position of the integrated value larger than two adjacent integrated values is detected as peak position (2).

Herein, as shown in FIG. 13, the fifth integrated value as counted from the left is larger than two adjacent integrated values (the fourth and sixth integrated values from the left). Accordingly the position of the fifth integrated value as counted from the left will be detected as peak position (2).

The integrated value of frequency band E is divided by peak value P in the synthesized waveform of frequency bands A to D to normalize the vibration waveform (S114).

By the normalization, the vibration waveform is represented in vibration intensity by a dimensionless number of 0 to 1. Thus, the detected vibration waveform can be compared with the knock waveform model regardless of the vibration intensity. This can eliminate the necessity of storing a large number of knock waveform models corresponding to intensity of vibration and thus facilitates preparation of a knock waveform model.

A timing at which vibration intensity attains the highest of the normalized vibration waveform i.e., peak position (2), and the timing at which vibration intensity attains the highest of the knock waveform model are matched, and in this state deviation in absolute value $\Delta S(I)$ between the normalized vibration waveform and the knock waveform model is calculated for each crank angle. Based on the sum $\Sigma\Delta S(I)$ of $\Delta S(I)$s and value S representing the vibration intensity of the knock waveform as integrated for the crank angle, the coefficient of correlation K is calculated as $K=(S-\Sigma\Delta S(I))/S$ (S116). This allows numerical representation and objective determination of the degree of matching between the detected vibration waveform and the knock waveform model. Further, by the comparison between the vibration waveform and the knock waveform model, it becomes possible to analyze whether the vibration is derived from knocking or not, from the behavior of vibration such as the attenuation tendency of vibration.

Further, 90-degrees integrated value P is divided by BGL, whereby the knock intensity N is calculated (S118). If the coefficient of correlation K is larger than a predetermined value and knock intensity N is larger than the determination value V(KX) (YES at S120), it is determined that knock has occurred (S122) and the ignition timing is retarded (S124). This prevents knocking.

If the conditions that the coefficient of correlation K is larger than a predetermined value and knock intensity N is larger than the determination value V(KX) are not satisfied (NO at S120), it is determined that knock has not occurred (S126), and the ignition timing is advanced (S128). In this manner, by the comparison of knock intensity N and determination value V(KX), whether knock has occurred or not is determined cycle by cycle of ignition, and the ignition timing is retarded or advanced accordingly.

As described above, in the knock determination device in accordance with the present embodiment, if the weight to vibration in a frequency band (for example, frequency band of first tangential mode) that is much influenced by superposition of noise other than knocking and susceptible to superposition of vibration corresponding to knocking is made smaller, influence of noise in determining knocking can be reduced. Accordingly, false determination of knocking caused by vibration in the frequency band influenced by noise is prevented, while knock determination can be made using vibration in the frequency band susceptible to superposition of vibration corresponding to knocking, whereby false determination can be reduced. Therefore, a knock determination device and a knock determination method for an internal combustion engine that can reduce false determination of knocking can be provided.

Because of any change in weight or dependent on susceptibility to superposition of knock-specific vibration on each frequency band, the median of frequency distribution of each frequency band may possibly deviate from the median of frequency distribution of vibration intensity of other frequency bands. Therefore, using the mean value of medians of vibration intensity frequency distribution of each frequency band as a reference, the frequency distribution is corrected, whereby the influence of deviation of median among frequency distributions on the detected vibration intensity is curbed, and false determination of knocking can be reduced.

In the present embodiment, by making smaller the weight to the vibration in the frequency band of first tangential mode, the influence of noise on knock determination is reduced. Alternatively, or additionally, the weight may be changed such that the ratio of vibration intensity of a frequency band that has influence on knock determination smaller than a prescribed degree because of superposition of noise other than knocking and is susceptible to superposition of vibration corresponding to knocking increases. By this approach also, the influence of noise in determining knocking can be reduced and, therefore, false determination of knocking can be prevented. The frequency band that has influence on knock determination smaller than a prescribed degree because of superposition of noise other than knocking and is susceptible to superposition of vibration corresponding to knocking is, for example, the frequency band of third tangential mode. For instance, the weight coefficient of the frequency band of third tangential mode may be increased to a value larger than "1.0" (for example, "2.0").

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

The invention claimed is:

1. A knock determination device for an internal combustion engine, comprising:
   a detecting unit detecting vibration of the internal combustion engine; and
   a determination unit connected to said detecting unit; wherein
   said determination unit includes
   a plurality of band-pass filters extracting, from said detected vibration, vibrations of a plurality of predetermined frequency bands corresponding to knocking, respectively,
   an integrating unit calculating a plurality of integrated values corresponding to intensities of the extracted vibrations of the plurality of frequency bands, respectively, and,
   a synthesizing unit changing a plurality of weights corresponding to the plurality of frequency bands, respectively, such that, among the, plurality of frequency bands, weight on the intensity of vibration in the frequency band of first tangential mode is made smaller than weight on intensities of vibrations in other frequency bands and synthesizing a vibration waveform of a predetermined crank angle interval based on said plurality of integrated values and said plurality of weights on intensities, and,
   said determination unit determines whether or not knock has occurred in said internal combustion engine, using said synthesized vibration waveform.

2. A knock determination device for an internal combustion engine, comprising:
   a detecting unit detecting vibration of the internal combustion engine; and
   a determination unit connected to said detecting unit; wherein said determination unit includes
   a plurality of band-pass filters extracting, from said detected vibration, vibrations of a plurality of predetermined frequency bands corresponding to knocking, respectively,
   an integrating unit calculating a plurality of integrated values corresponding to intensities of the extracted vibrations of the plurality of frequency bands, respectively, and,
   a synthesizing unit changing a plurality of weights corresponding to the plurality of frequency bands, respectively, such that, among the plurality of frequency bands, weight on the intensity of vibration in the frequency band of third tangential mode is made larger than weight on intensities of vibrations in other frequency bands and synthesizing a vibration waveform of a predetermined crank angle interval based on said plurality of integrated values and said plurality of weights on intensities, and,
   said determination unit determines whether or not knock has occurred in said internal combustion engine, using said synthesized vibration waveform.

3. The knock determination device for an internal combustion engine according to claim 1 or 2, wherein
   based on a median of intensity of a frequency distribution of said vibration intensities of the plurality of frequency bands, said determination unit corrects said frequency distribution, and determines whether or not knock has occurred in said internal combustion engine using said corrected frequency distribution, in addition to said detected vibration waveform.

4. The knock determination device for an internal combustion engine according to claim 3, wherein
said determination unit corrects said frequency distribution using, as a reference, a mean value of medians of intensity of the frequency distribution of said vibration intensities of the plurality of frequency bands.

5. The knock determination device for an internal combustion engine according to claim 1 or 2, wherein
said determination unit calculates knock intensity based on a sum of integrated values between predetermined crank angles of said vibration intensities of the plurality of frequency bands, and
determines whether or not knock has occurred in said internal combustion engine based on a result of comparison between said calculated knock intensity and a predetermined determination value.

6. The knock determination device for an internal combustion engine according to claim 1 or 2, wherein
said determination unit determines whether or not knock has occurred in said internal combustion engine based on a result of comparison between said detected vibration waveform and a predetermined waveform model as a reference of vibration waveform of said internal combustion engine, in addition to the result of comparison of said knock intensity.

7. A knock determination method for an internal combustion engine, comprising the steps of:
detecting vibration of the internal combustion engine;
extracting vibrations of a predetermined plurality of frequency bands corresponding to knocking, from said detected vibration;
changing weights to intensities of the extracted vibrations of the plurality of frequency bands such that influence of noise other than knocking is reduced;
detecting a vibration waveform of a predetermined crank angle interval based on the intensity of vibrations of the plurality of frequency bands; and
determining whether or not knock has occurred in said internal combustion engine, using said detected vibration waveform, wherein
said vibrations of the plurality of frequency bands include vibration of a frequency band of first tangential mode; and
said step of changing changes the weight such that weight on the intensity of vibration in the frequency band of first tangential mode is made smaller than weight on intensities of vibrations in other frequency bands.

8. A knock determination method for an internal combustion engine, comprising the steps of:
detecting vibration of the internal combustion engine;
extracting vibrations of a predetermined plurality of frequency bands corresponding to knocking, from said detected vibration;
changing weights to intensities of the extracted vibrations of the plurality of frequency bands such that influence of noise other than knocking is reduced;
detecting a vibration waveform of a predetermined crank angle interval based on the intensity of vibrations of the plurality of frequency bands; and
determining whether or not knock has occurred in said internal combustion engine, using said detected vibration waveform, wherein
said vibrations of the plurality of frequency bands include vibration of a frequency band of third tangential mode; and
said step of changing changes the weight such that weight on the intensity of vibration in the frequency band of third tangential mode is made larger than weight on intensities of vibrations in other frequency bands.

9. The knock determination method for an internal combustion engine according to claim 7 or 8, further comprising the step of
correcting, based on a median of intensity of a frequency distribution of said vibration intensities of the plurality of frequency bands, said frequency distribution; wherein
said step of determining determines whether or not knock has occurred in said internal combustion engine using said corrected frequency distribution, in addition to said detected vibration waveform.

10. The knock determination method for an internal combustion engine according to claim 9, wherein
said step of correcting corrects said frequency distribution using, as a reference, a mean value of medians of intensity of the frequency distribution of said vibration intensities of the plurality of frequency bands.

11. The knock determination method for an internal combustion engine according to claim 7 or 8, wherein
said step of determining includes the steps of
calculating knock intensity based on a sum of integrated values between predetermined crank angles of said vibration intensities of the plurality of frequency bands, and
making determination as to whether or not knock has occurred in said internal combustion engine based on a result of comparison between said calculated knock intensity and a predetermined determination value.

12. The knock determination method for an internal combustion engine according to claim 7 or 8, wherein
said step of determining determines whether or not knock has occurred in said internal combustion engine based on a result of comparison between said detected vibration waveform and a predetermined waveform model as a reference of vibration waveform of said internal combustion engine, in addition to the result of comparison of said knock intensity.

* * * * *